July 7, 1936.　　　　J. W. JONES　　　　2,046,517
TRACTOR
Filed May 10, 1934　　　　3 Sheets-Sheet 1

INVENTOR.
Joseph W. Jones
BY
HIS ATTORNEY

July 7, 1936.　　　J. W. JONES　　　2,046,517
TRACTOR
Filed May 10, 1934　　　3 Sheets-Sheet 3

INVENTOR
Joseph W. Jones.
BY
HIS ATTORNEY.

Patented July 7, 1936

2,046,517

UNITED STATES PATENT OFFICE 2,046,517

TRACTOR

Joseph W. Jones, Corning, N. Y., assignor to Ingersoll-Rand Company, Jersey City, N. J., a corporation of New Jersey Application May 10, 1934, Serial No. 724,875

2 Claims. (Cl. 180—9.2)

This invention relates to tractors, and more particularly to tractors of the track-laying type.

One object of the invention is to assure ready maneuverability of the tractor.

Another object is to simplify the construction of apparatus of this character and at the same time to assure a rugged and durable structure which may be readily and cheaply maintained in efficient working condition.

Other objects will be in part obvious and in part pointed out hereinafter.

Figure 1:
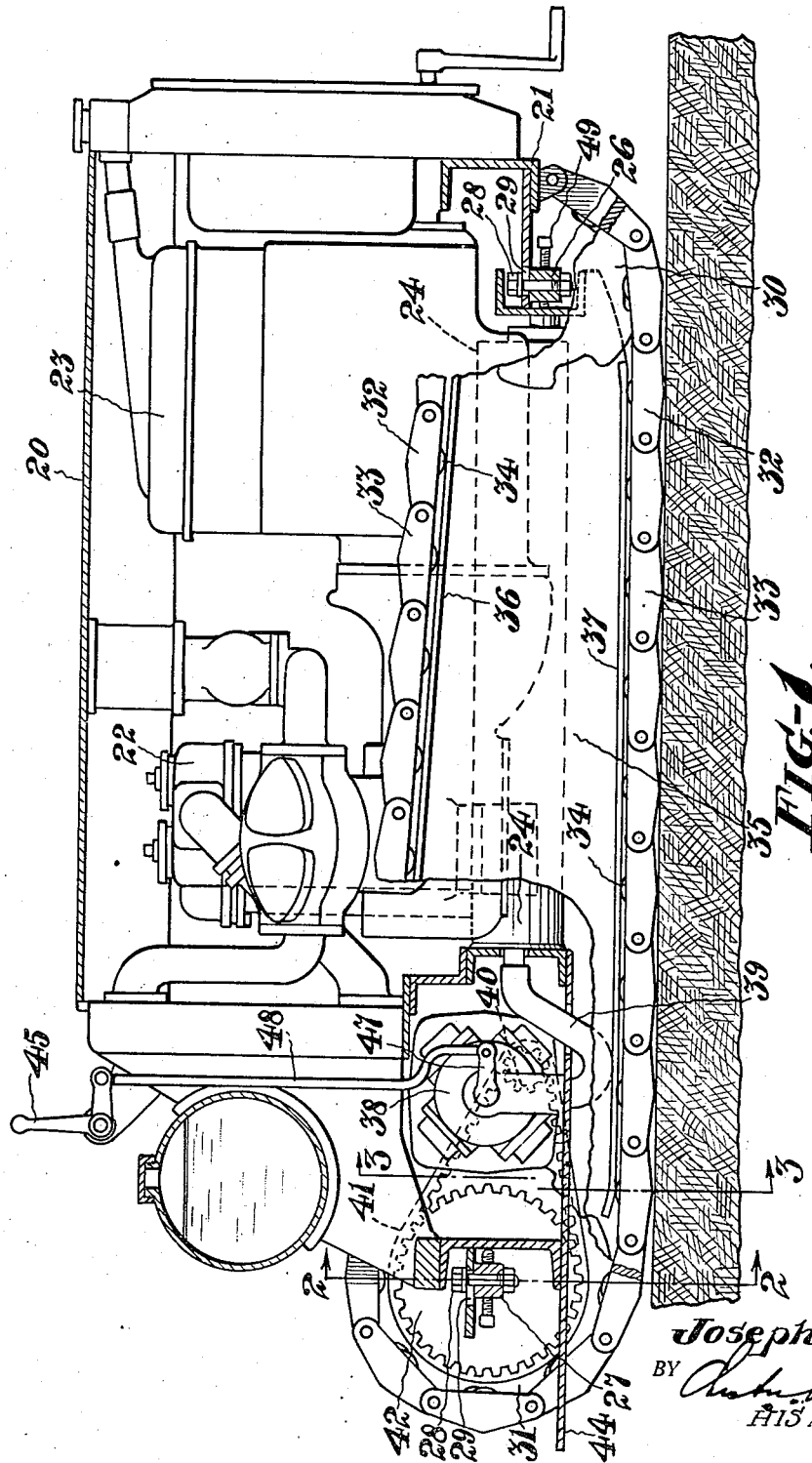
Figure 2:
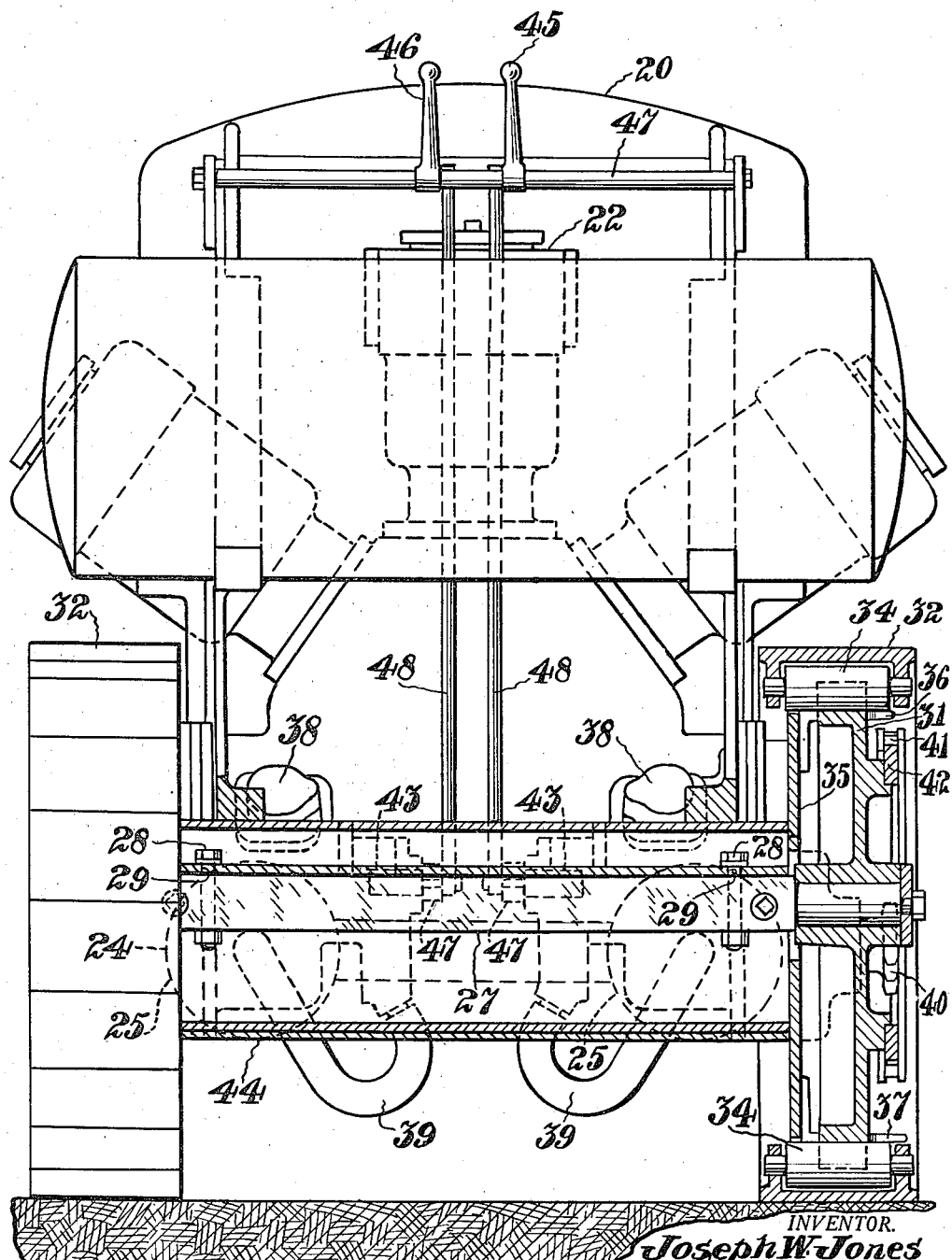
Figure 3:
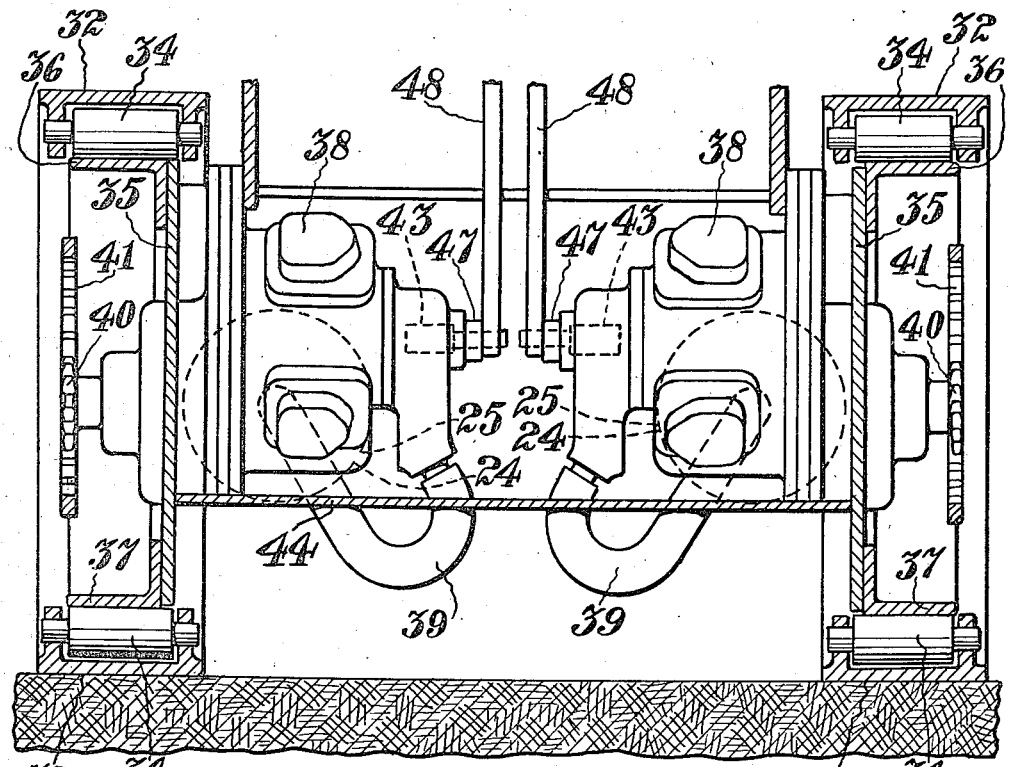

In the drawings accompanying this specification and in which similar reference numerals refer to similar parts, Figure 1 is a side elevation, partly broken away, of a tractor constructed in accordance with the practice of the invention, Figure 2 is an end elevation, partly in section, taken through Figure 1 on the line 2—2, and Figure 3 is a view similar to Figure 2 taken through Figure 1 on the line 3—3.

Referring more particularly to the drawings, 20 designates, in general, a tractor comprising a main frame 21 shown as being fabricated from structural shapes. The main frame 21 supports a compressor 22 which may be connected directly to an internal combustion engine 23 whereby it is driven. The compressor 22 may be of the multi-stage type, as indicated, and its final discharge output is delivered to a storage receiver 24 consisting, in this instance, of a pair of inter-connected tanks 25 mounted in the main frame 21.

On the front and rear ends of the main frame 21 are axles 26 and 27, respectively, which are supported by bolts 28 extending therethrough and through longitudinally extending slots 29 in the frame 21. Journalled on the ends of the axles 26 and 27 are sprocket wheels 30 and 31, respectively, over which are trained endless tread belts 32.

The tread belts 32 consist of tread links 33 which carry rollers 34 wherewith the sprockets of the wheels 30 and 31 engage to propel the tread belts. On the sides of the main frame 21 are vertical guide frames 35 in the form of plates which may be rigidly secured to the main frame, as by welding. On the outer sides of the guide frames 35 are top and bottom laterally extending flanges 36 and 37 along which the rollers travel, and the flanges 37 seat upon the rollers of the links engaging the ground and thus serve to support the entire super-structure.

In order to enable the tractor to be readily maneuvered to a desired position each tread belt is provided with a separate driving motor 38 secured to the inner surfaces of the guide frames 35 and out of the planes of the tread belts so that they will be well out of the path of dirt and stones dropping from the inner edges of the tread belts. The motors 38 are of the reversible type actuated by compressed air which is conveyed to the motors from the storage receiver 24 by conduits 39. The driving connection between the motors and the driven sprocket wheels, in this instance those designated 31, is preferably of the chain and sprocket type. The motors are accordingly provided with sprocket wheels 40 having trained thereon chains 41 which also engage sprocket wheels 42 disposed coaxially with the sprocket wheels 42 as, for example, directly on the outer sides of the sprocket wheels 31.

To the end that each motor may be separately controlled said motors are provided with individual controlling devices consisting of suitable valves 43 to control the admission of pressure fluid to the motors, and on the rear end of the tractor, within convenient reach of an operator's platform 44, are a pair of throttle levers 45 and 46 which are mounted pivotally upon a bar 47 and are connected to the levers 47 of the valves 43 by links 48.

In order that the axles 26 and 27 may be conveniently shifted, longitudinally, for controlling the tension of the tread belt 32 and the tension of the chain 41, said axles are provided with set screws 49 which are threaded through the axles and seat against the main frame 21.

In the operation of the device, whenever it is intended to propel the tractor along a straight course the levers 45 and 46 are moved simultaneously, and in even degree forwardly or rearwardly, depending upon the desired direction of travel, to admit equal quantities of pressure fluid to the motors. Whenever it is desired to veer from the original course the speed of one motor is reduced and, with the other motor operating at a higher speed, the tractor will swing in the direction of the retarded belt tread, or if the motors are operated to cause one tread belt to travel in one direction and the other tread belt to travel simultaneously in the opposite direction and at the same speed, the tractor may be turned around within a space equal to its own length.

If, owing to wear or other causes the tread belts 32 or the chains 41 are found to be improperly tensioned the bolts 28 may be loosened and the set screws 49 are then manipulated to either increase or reduce the tension of these elements. By manipulating the set screw 49 associated with the axle 27 said axle may be shifted to tighten or loosen the chains 41 and to simultaneously tighten or loosen the tread belts 32. Should such adjustment of the axle 27 have the effect of correctly tensioning only the chains 41 and not the tread belts 32 the tread belts may be separately adjusted by shifting the axle 26. After the correct adjustments have been made the bolts 28 are again tightened to secure the axles fixedly to the main frame.

In practice it has been found that a tractor constructed in accordance with the present invention is ideally suited for use as a mounting for portable compressors. Particularly those employed for supplying compressed air to track-maintenance tools and on developments where there is little available space for maneuvering the tractor. Being capable of rotating about its vertical axis the tractor may be conveniently propelled and turned on the track or on the shoulders adjacent thereto.

I claim:

1. A tractor, comprising a main frame, a pair of tread belts, a vertical guide member on each side of the main frame to support the entire weight of the tractor and having laterally extending top and bottom flanges on the outer sides thereof for guiding the tread belts, a motor mounted on the inner surface of each guide member and lying out of the plane of the adjacent tread belt, driving connections between each motor and the contiguous tread belt, and individual power controlling devices for each motor.

2. A tractor, comprising a main frame, a pair of tread belts, rollers carried by the tread belts, a vertical guide member on each side of the main frame to support the entire weight of the tractor and having laterally extending top and bottom flanges on the outer sides thereof for guiding the tread belts, said bottom flanges seating upon the rollers, motors secured to the confronting surfaces of the guide members and lying out of the planes of the tread belts, driving connections between each motor and the contiguous tread belt, and individual power controlling devices for each motor.

JOSEPH W. JONES.